G. P. McDONNELL.
SIGNALING SEALING DEVICE FOR VALVES, &c.
APPLICATION FILED OCT. 10, 1918.
1,312,191.
Patented Aug. 5, 1919.
2 SHEETS—SHEET 1.
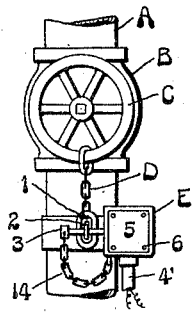
Fig. I.
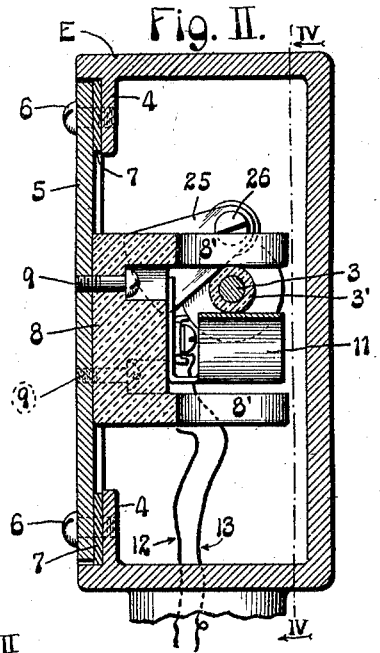
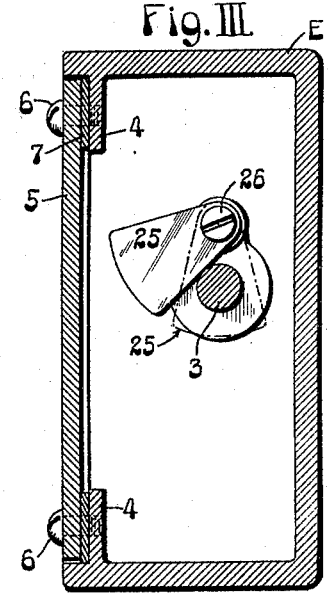
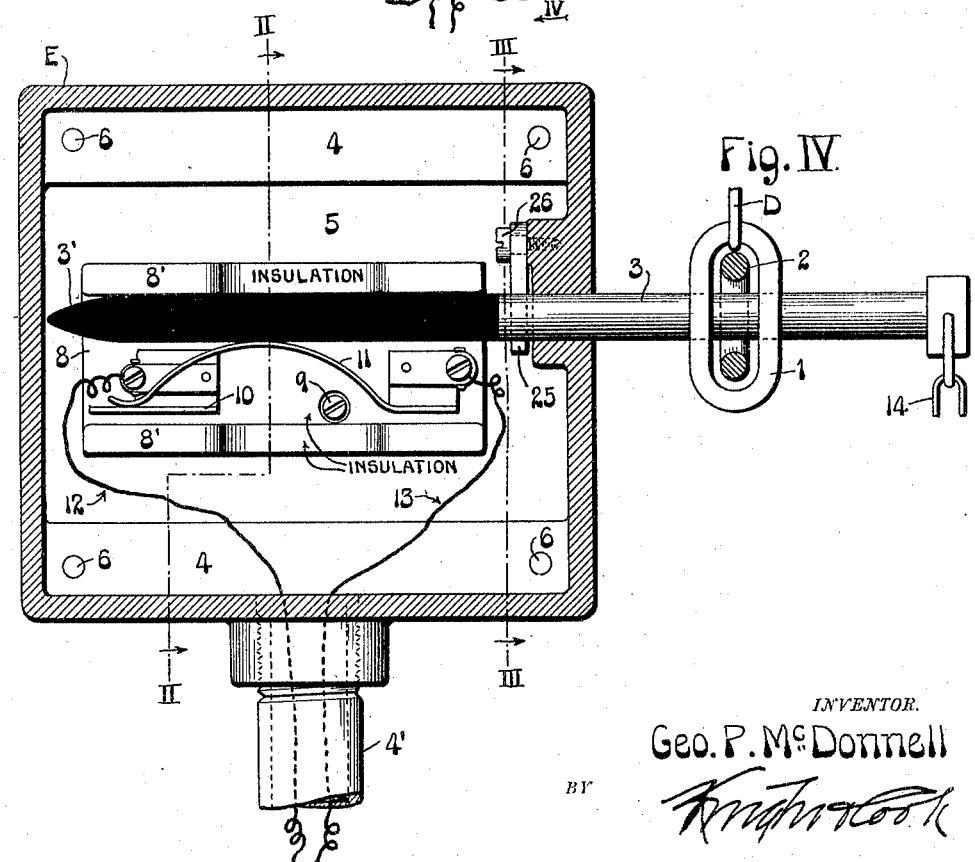
INVENTOR.
Geo. P. McDonnell
BY
ATTORNEYS.

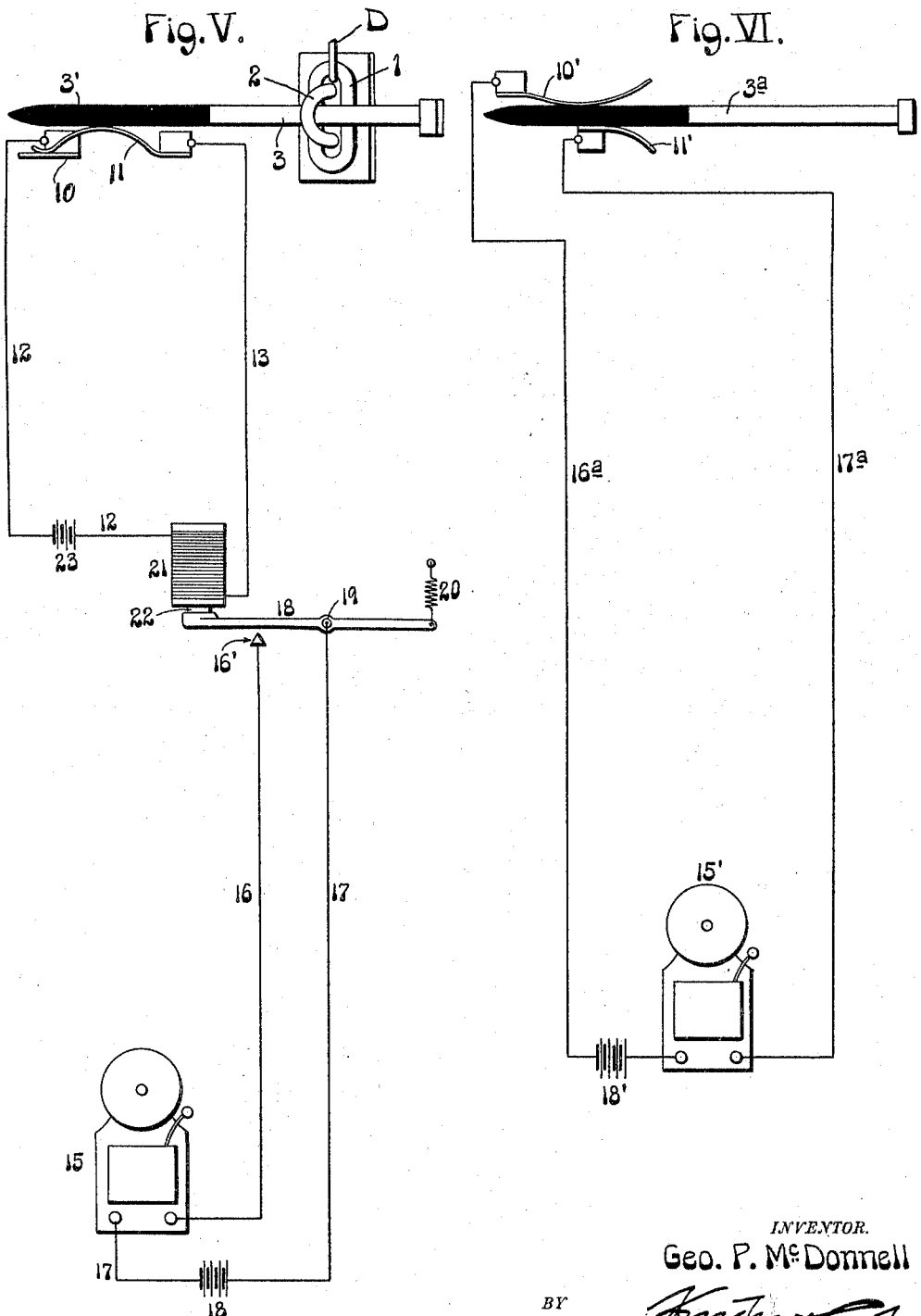

UNITED STATES PATENT OFFICE.

GEORGE P. McDONNELL, OF ST. LOUIS, MISSOURI.

SIGNALING SEALING DEVICE FOR VALVES, &c.

1,312,191.  Specification of Letters Patent.  Patented Aug. 5, 1919.

Application filed October 10, 1918. Serial No. 257,617.

*To all whom it may concern:*

Be it known that I, GEORGE P. MCDONNELL, a citizen of the United States of America, a resident of the city of St. Louis, State of Missouri, have invented certain new and useful Improvements in Signaling Sealing Devices for Valves, &c., of which the following is a full, clear, and exact description, reference being had to the accompanying drawings, forming a part of this specification.

This invention relates to improvements in signaling sealing devices, and the preferred form of the invention comprises a sealing member forming a quick detachable fastening for the article to be sealed, and a signal or alarm under the control of said sealing member. The alarm or signal is preferably actuated in response to movements of an electric switch under the control of the sealing member. To break the seal, the sealing member is moved to an abnormal position relative to the switch, and this results in the actuation of the alarm or signal indicating that the seal has been broken.

Devices of this kind are particularly adapted for use in sealing the water supply valves of automatic fire sprinkler system. Such valves are normally open to permit the flow of water whenever the automatic sprinkler heads are opened. In the maintenance of automatic fire sprinkler systems many precautions are usually taken to retain the water supply valves in their open positions, for if a valve is closed the water cannot flow to the sprinklers in the line leading thereto. It is customary to frequently inspect the valves, and ordinary seals have been used to seal the valves in their open positions. It is also old to use, instead of a seal, an alarm which is operated automatically in response to movements of the valve.

The device to be hereinafter described comprises a seal forming a readily detachable fastening for the valve operating member, and an alarm or signal actuated automatically whenever the seal is broken, the valve being normally sealed in its open position, and the alarm being actuated during the operation of breaking the seal.

One of the objects of the invention is to provide a simple device of this kind adapted to be easily applied to the valve, or other article to be sealed.

Another object is to provide an electric sealing device including a closed electric circuit and an alarm, or signal, to be actuated whenever the circuit is opened. The closed circuit preferably includes a switch and the sealing member retains this switch in its closed position. When the sealing member is moved to break the seal, the switch moves to its open position, thus opening the circuit and actuating the alarm. If the electric circuit is accidentally opened at any place, for instance, by corrosion of the switch terminals, or by accidental breakage of one of the conductors, the alarm will be actuated. For this reason, the elements forming the closed circuit require very little inspection. Furthermore, an unauthorized person may attempt to avoid actuation of the alarm, by first cutting the wires leading from the device and then breaking the seal. In this event, the operation of cutting the wires will open the electric circuit and result in the actuation of the alarm. I, therefore, prefer to use the valve sealing member as a means for retaining an electric circuit in its closed condition.

Another object is to prevent the sealing device from being readily or quickly restored after it has been moved to break the seal. When the seal is broken the valve can be operated, but the signal or alarm will be effective until the sealing member is restored. To compel the actuation of the alarm for a considerable period of time, I preferably provide a device with an automatic shutter which prevents immediate restoration of the sealing device after it has been moved to actuate the alarm.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a front elevation showing the seal and the switch housing associated with a valve.

Fig. II is an enlarged vertical section taken approximately on the line II—II, Fig. IV.

Fig. III is a vertical section on the line III—III, Fig. IV, showing the automatic shutter for closing the opening into which the sealing pin is inserted.

Fig. IV is a vertical section on the line IV—IV, Fig. II, looking toward the front of the switch housing.

Fig. V is a diagrammatical view of the device showing a normally closed circuit under the control of the sealing device.

Fig. VI is a diagrammatical view illustrating a normally open circuit under the control of the sealing device.

To illustrate the invention I have shown (Fig. I) water supply pipe A provided with a valve B having an operating wheel C which may be turned for the purpose of opening and closing the valve. The sealing device preferably comprises a shackle D in the form of a chain permanently secured to the valve operating member C, and provided at one end with an elongated loop, or link 1. 2 designates a fixed staple adapted to receive the link 1, as shown by Figs. I, IV and V, and 3 designates a sealing pin adapted to be inserted through the staple 2 for the purpose of securing the link. It will now be understood that the shackle D may be fastened by inserting the sealing pin 3 through the staple 2, thus locking, or fastening the valve operating wheel C. Obviously, these elements can be used to detachably fasten the valve in its open position.

E designates a switch housing into which the sealing member 3 is inserted for the purpose of controlling an electric switch, the alarm being actuated in response to movements of the switch. The switch housing is provided with internal flanges 4 and a closure 5 secured to said flanges by means of screws 6. To exclude water, or moisture, from the switch housing, gaskets 7 are preferably interposed between the closure 5 and the flanges 4. The notched heads of the screws 6 are exposed at the exterior of the housing, and the closure 5 may be removed when the screws 6 are removed from the flanges 4.

An insulating block 8, secured to the closure 5 by means of screws 9, is provided with wings 8'. The normally closed electric switch comprises a fixed contact member 10 and a movable contact member 11, both of which are secured to the insulator 8. A conductor 12 is secured to the fixed contact member 10, and a conductor 13 is secured to the movable contact member 11, as shown in Figs. II, IV and V. The conductors 12 and 13 pass through a pipe 4' secured to the bottom of the switch housing. The inner end portion of the sealing pin 3 is preferably reduced and covered with insulating material 3', (Figs. II and IV). The movable contact member 11 is preferably made of spring material, and it has a bowed portion adapted to be engaged by the insulation 3' on the sealing pin 3. This movable contact member 11 tends to spring away from the fixed contact 10, but the switch is normally held in its closed position by the sealing pin 3, which lies between the movable contact member 11 and the wing 8' on the insulating block 8. The end of the sealing pin is preferably pointed so that it can be easily inserted between the contact member 11 and wing 8' with the result of closing the switch. The sealing pin 3 may be connected to the switch housing by means of a chain 14, as shown in Fig. I.

The alarm, or signal, shown in Fig. V, is an electric bell 15, to which conductors 16 and 17 are connected, the conductor 17 being provided with a battery 18. The bell circuit also includes a contact member 16', and a contact member in the form of a lever 18 to which the conductor 17 is electrically connected. The lever 18 is pivoted at 19, and a weak tension spring 20 tends to move said lever 18 into engagement with the contact member 16'. However, the bell circuit is normally open between the contact 16' and lever 18. To retain the lever 18 in the position shown in Fig. V, I preferably utilize a relay comprising an electro-magnet 21 having a core 22, and one end of the lever 18 forms an armature which is normally attracted to the core 22. The winding of the electro-magnet 21 is in the closed circuit including the conductors 12 and 13, and the switch members 10 and 11. This closed circuit is normally energized by a battery 23. It is to be understood, however, that any suitable source of electricity may be used to energize the electrical elements herein shown.

Under normal conditions, the sealing pin 3 and the electrical elements occupy the positions shown by Fig. V. The switch 10—11 is held in its closed position by the sealing pin, and the electro-magnet 21 is energized to retain the lever 18 out of engagement with contact 16'. When the sealing pin 3 is withdrawn from the yielding contact member 11, the latter will spring away from the fixed contact 10, thereby opening the switch and stopping the transmission of energy to the electro-magnet 21. The tension spring 20 (Fig. V) will then move lever 18 into engagement with contact 16', thus closing the bell circuit to actuate the alarm. Therefore, when the sealing pin is withdrawn from the staple 2 for the purpose of unlocking the valve, the alarm will be actuated, and it will be effective until the contact member 10 is again engaged with the contact 11.

To prevent the quick restoration of the sealing pin, I preferably arrange in the switch housing an automatic shutter which closes the opening through which the sealing pin is inserted into the housing. The shutter 25 is pivoted at 26, and it tends to drop by gravity to the position shown in dotted lines in Fig. III. However, under normal conditions, the shutter 25 occupies the position shown by full lines in Figs. III and IV, and it is held in this open position by engaging the sealing pin 3. When the seal is broken by the removal of the sealing pin, the shutter 25 drops to its closed position and it then prevents the sealing pin from being inserted into the housing. To replace the sealing pin it is necessary to remove the screws 6 whereby the closure 5 is secured, and it is also necessary to remove said closure and to lift the shutter 25 to a position entirely above the path of the sealing pin. When the shutter is held in this position the sealing pin can be inserted into the switch housing.

It will also be observed that the normally closed switch 10—11 is secured to the insulating block 8, and that said block is secured to the closure 5. If an attempt is made to remove the closure for the purpose of tampering with the contents of the housing, the normally closed switch will be removed with the closure, and thereby separated from the sealing pin 3. In this event the yielding contact 11 will spring to its open position so as to actuate the alarm, as previously pointed out.

The electrical elements can be very easily tested by withdrawing the sealing pin 3 far enough to release it from the yielding contact 11, thereby opening the switch. This can be done without entirely removing the sealing pin, and without actuating the shutter 26.

The modification shown in Fig. VI comprises a sealing pin 3ª normally interposed between a fixed contact member 11′ and a movable contact member 10′. The contact member 10′ tends to spring into engagement with the contact 11′, but these contacts are normally separated by the insulated portion of the pin 3ª. An alarm 15′ is connected to contacts 10′ and 11′ by means of conductors 16ª and 17ª, respectively. The alarm may be energized by a battery 18′. When the pin 3ª is withdrawn from the contacts, the contact 10′ springs into engagement with the contact 11′, thereby closing the circuit and permitting the battery 18′ to energize the alarm 15′.

I claim:—

1. In a sealing device, a housing, a sealing member extending into said housing to detachably fasten the article to be sealed, said sealing member being removable from said housing to unseal the article, and means for preventing the restoration of said sealing member after it has been withdrawn from said housing.

2. In a sealing device, a housing having an opening, a sealing member extending into said opening to detachably fasten the article to be sealed, said sealing member being removable from said housing to unseal said article, and an automatic closure for said opening preventing the restoration of said sealing member after it has been withdrawn from said housing.

3. In a signaling sealing device, an alarm, an electric switch controlling said alarm, a housing inclosing said electric switch, a sealing member extending into said housing to detachably fasten the article to be sealed, said sealing member being removable from said housing to unseal said article, said electric switch being under the control of said sealing member, and means for preventing the restoration of said sealing member after it has been withdrawn from said housing.

4. In a signaling sealing device, an alarm, an electric switch controlling said alarm, a housing inclosing said electric switch, a sealing member extending into said housing to detachably fasten the article to be sealed, said sealing member being removable from said housing to unseal said article, said housing having an opening into which the sealing member is inserted to coöperate with the switch, and an automatic closure whereby said opening is closed when the sealing member is withdrawn from the housing.

5. In a signaling sealing device, an alarm, an electric switch controlling said alarm, a housing inclosing said electric switch, a sealing member extending into said housing to detachably fasten the article to be sealed, said sealing member being removable from said housing to unseal said article, said housing having an opening into which the sealing member is inserted to coöperate with said switch, and a shutter tending to close said opening to exclude the sealing member therefrom said shutter being normally held in its open position by the sealing member, and said shutter being free to move to its closed position when the sealing member is withdrawn from the housing.

6. In a signaling sealing device, an alarm, an electric switch controlling said alarm, a housing inclosing said electric switch, a sealing member extending into said housing to detachably fasten the article to be sealed, said sealing member being removable from said housing to unseal said article, said housing having an opening into which said sealing member is inserted to coöperate with said switch, and a pivotally mounted shutter arranged in said housing to form a closure for said opening said shutter being normally held in its open position by engaging the sealing member and being free to move to its closed position when the sealing member is withdrawn from the housing.

7. In a signaling sealing device, an alarm, an electric switch controlling said alarm, a housing inclosing said switch, a sealing member movable in said housing to actuate said switch, the seal being broken or unsealed by moving said sealing member to actuate the switch, and means preventing restoration of said sealing member after it has been moved to break the seal.

8. In a signaling sealing device, a housing, an electric switch in said housing, a signal under the control of said switch, a shackle adapted to be secured to the article to be sealed, a keeper adapted to receive said shackle to fasten the article to be sealed, and a combined latch pin and sealing pin coöperating with said shackle and keeper at the exterior of said housing and extending into said housing to control said electric switch.

9. In a signaling sealing device, a housing, an electric switch in said housing, a signal under the control of said switch, a shackle adapted to be secured to the article to be sealed, said shackle being provided with a loop, a keeper in the form of a staple adapted to receive said loop to fasten the shackle, and a combined latch pin and sealing pin inserted into said staple and arranged over said loop to fasten the shackle to the staple; a portion of said pin being extended into said housing to control said switch.

10. In a signaling sealing device, a housing, an electric switch in said housing, a signal under the control of said switch, a shackle located at the exterior of said housing and adapted to be secured to the article to be sealed, said shackle being provided with a loop, a fixed keeper in the form of a staple located at the exterior of the housing and adapted to receive said shackle to fasten the article to be sealed, and a combined latch pin and sealing pin coöperating with said loop and staple to fasten the shackle at the exterior of the housing, a portion of said pin being extended into said housing to control said switch, and said pin being free to be withdrawn from said housing, so as to permit quick removal of the shackle from the staple.

11. In a signaling sealing device, an alarm, electrical means controlling said alarm, said means including a yielding switch member, a housing inclosing said switch member, and a movable sealing member extending into said housing, said switch member being actuated by said sealing member, said housing having a closure and only one of said members being secured to said closure, the other member being secured to a relatively fixed part of the housing so as to provide for the release of said switch member from said sealing member when the closure is moved to its open position.

12. In a signaling sealing device, an alarm, electrical means controlling said alarm, said means including a yielding switch member, a housing inclosing said switch member, and a movable sealing member extending into said housing, said switch member being actuated by said sealing member, said housing having a closure and the yielding switch member being secured to said closure, a relatively fixed portion of the housing being provided with an opening for the reception of said sealing member, and said yielding switch member being movable away from said sealing member to provide for the release of said switch member when the closure is moved to its open position.

13. In a signaling sealing device, an alarm, electrical means controlling said alarm, said means including a yielding switch member, a housing inclosing said switch member, and a movable sealing member extending into said housing, said switch member being actuated by said sealing member, said housing having a closure and a relatively fixed wall provided with an opening for the reception of said sealing member, said yielding switch member being secured to said closure and said sealing member being mounted in the opening in said relatively fixed wall, and said yielding switch member being movable independently of said sealing member to provide for the removal of the switch member from said sealing member.

In testimony that I claim the foregoing I hereunto affix my signature.

GEORGE P. McDONNELL.

Copies of this patent may be obtained for five cents each, by addressing the "Commissioner of Patents, Washington, D. C."